United States Patent [19]

Schilling

[11] 4,125,202
[45] Nov. 14, 1978

[54] PRESSURE VESSEL, ESPECIALLY FOR A NUCLEAR REACTOR CORE

[75] Inventor: Franz Schilling, Kempen, Germany

[73] Assignee: Siempelkamp Giesserei GmbH & Co., Krefeld, Germany

[21] Appl. No.: 824,309

[22] Filed: Aug. 12, 1977

[30] Foreign Application Priority Data

Aug. 14, 1976 [DE] Fed. Rep. of Germany ....... 2636743

[51] Int. Cl.² .......................... B65D 7/02; B65D 25/14
[52] U.S. Cl. ........................................... 220/3; 176/87; 220/5 A; 220/89 A
[58] Field of Search .............. 220/63 R, 3, 5 A, 89 A; 176/87

[56] References Cited

U.S. PATENT DOCUMENTS

| | | | |
|---|---|---|---|
| 1,921,809 | 8/1933 | Crain | 220/89 A |
| 1,992,470 | 2/1935 | Carlstrom | 220/63 R |
| 1,993,301 | 3/1935 | Tryon et al. | 220/89 A |
| 2,209,290 | 7/1940 | Watts | 220/63 R |
| 3,256,069 | 6/1966 | Peterson | 220/3 |
| 3,596,793 | 8/1971 | Kocher | 220/63 R |

*Primary Examiner*—William Price
*Assistant Examiner*—Allan N. Shoap
*Attorney, Agent, or Firm*—Karl F. Ross

[57] ABSTRACT

A pressure vessel, especially as a containment for a nuclear reactor core, comprises a stack of horizontal cast-metal members which define horizontal joints or seams between them, the stack being held together under pre-stress by a multiplicity of tension elements, e.g. cables or rods. The stack is provided with a liner welded together from steel sections and having, in the region of the seams, a reduced thickness as well as a lower yieldability or tensile strength than the yieldability or tensile strength of the liner sections elsewhere. As a result, rupture of the liner is ensured in the region of the seams which constitute preferred pressure release cracks in the event of an explosion or excessive development of pressure within the vessel.

10 Claims, 2 Drawing Figures

FIG. 1
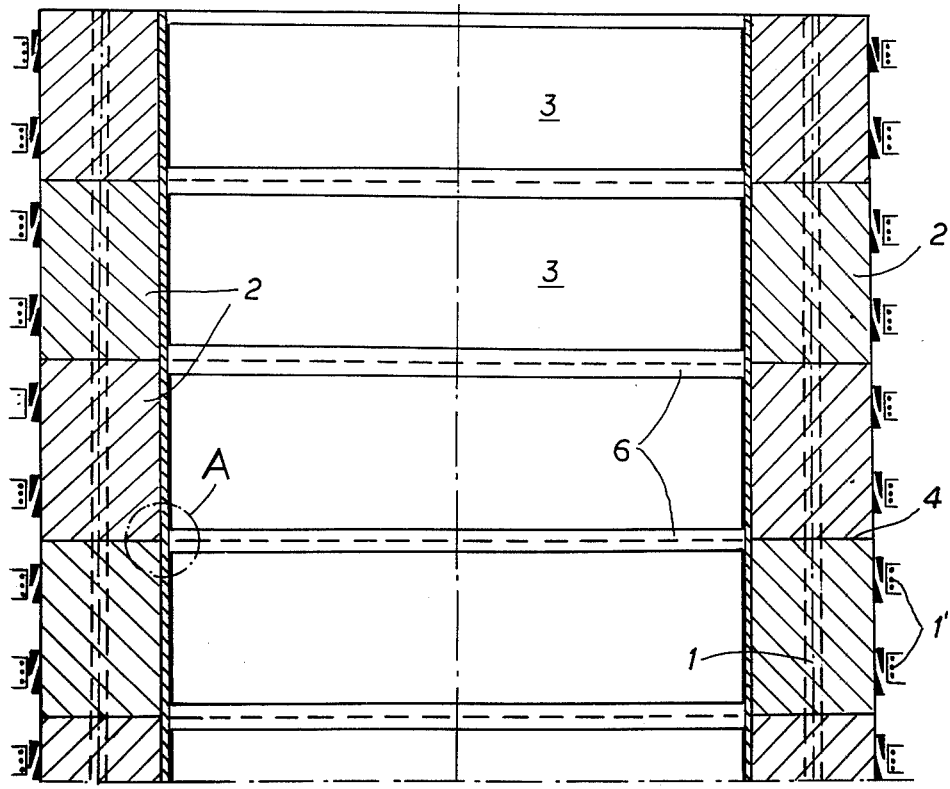
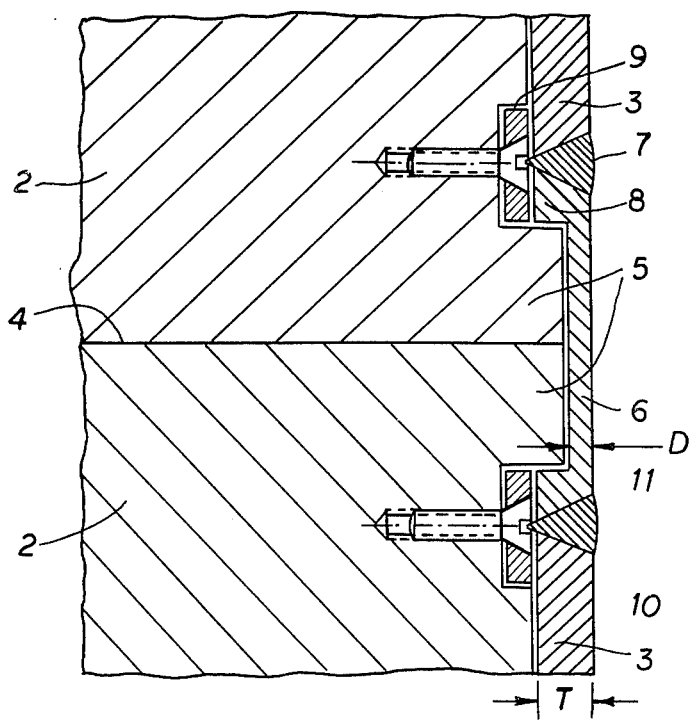
FIG. 2

PRESSURE VESSEL, ESPECIALLY FOR A NUCLEAR REACTOR CORE

CROSS REFERENCE TO RELATED APPLICATIONS

This application is related to my application Ser. No. 635,637 filed Nov. 26, 1975, now U.S. Pat. No. 4,047,632 issued Sept. 13, 1977 and the applications and patents there mentioned.

FIELD OF THE INVENTION

The present invention relates to a pressure vessel and, more particularly, to a pressure vessel adapted to serve as an enclosure for a nuclear-reactor core.

BACKGROUND OF THE INVENTION

It is known to provide pressure vessels for nuclear reactors which are hermetically sealed in a single piece and which, when subjected to an excessive internal pressure or explosion, tend to crack with axial rupture lines. Since the stress distribution in such vessels is such that an uncontrolled cracking or rupture of the vessel occurs, the pressure release may be too sudden and catastrophic.

Accordingly, it has been proposed heretofore, to constitute the pressure vessel of a stack of annular cast-metal members which are stressed together by tension elements, e.g. rods or cables, which control the separation of the cast members at the horizontal junctions which form preferred pressure-release sites in the event of a catastrophic or sudden pressure buildup within the interior of the vessel. The stack is generally lined internally with a steel liner welded together from sections.

In practice, the yieldability of the tension rods or cables, which are composed of steel, is about 2% while the yieldability of the steel liner is 20 – 30% so that pressure release at the horizontal seams or junctions cannot be guaranteed because of uncontrolled rupture of the liner. This, of course, defeats one of the primary reasons for using the case-metal annuluses in the first place.

More specifically, a pressure vessel of the latter type does not ensure a readily controllable pressure dissipation in the event of a catastrophe because pressure release does not always occur uniformly at the horizontal junctions which spread against the resistant force of the tension elements.

SUMMARY OF THE INVENTION

These objects and others which will become apparent hereinafter are attained in accordance with the present invention, in a pressure vessel which can have the usual bottom and top members, i.e. a floor and a cover formed from cast-metal segments or from one piece in a cast-metal. The vessel is provided with at least two wall-forming annular cast members stressed together in the axial direction by a plurality of peripherally spaced tension elements of steel, e.g. cables or rods, so as to define at least one horizontal junction between them serving as a desired separation crack for the release of pressure from the vessel.

The wall-forming portion of the vessel is provided with a steel liner which can be hermetically sealed from respective sections and, in accordance with an important feature of the invention, the sections spanning the aforementioned junction or seam are provided of reduced thickness so that the liner preferentially ruptures in the region of the junction.

According to an important feature of the invention, each of the cast-metal annular members defining a respective junction, is provided with an inwardly-extending annular ridge adjacent this junction while the junction-spanning section of the liner form-fittingly receives these ridges, i.e. is formed with an outwardly open groove into which these ridges project. Advantageously, these ridges reduce the cross-section of the interior of the vessel (without the liner) and extend inwardly beyond the remaining portions of the internal surface of the cast-metal annuluses by a distance equal to the difference in thickness between the junction-spanning liner section and the other sections forming the steel liner.

According to the invention, therefore, the liner can consist of main liner sections which are welded to junction-bridging liner sections along annular weld seams which straddle the aforementioned junction.

According to a feature of the invention, the junction-bridging liner section is composed of a steel of lower yieldability than the steel of the main liner sections.

In yet another feature of the invention, the weld seams which join the main liner sections to each junction-bridging liner section serve simultaneously to fuse or weld the liner to the cast-metal members, preferably via a band which can be attached to each cast-metal member, e.g. by bolts or screws, so as to facilitate welding.

The weld seams thus prevent the liner from lifting away from the cast-metal members and the form-fitting engagement of the junction-bridging liner section with the ridges prevents the junction-bridging section from being extruded into the gap formed at the junction by catastrophic pressure buildup within the vessel. In other words, this form-fitting engagement prevents flow of the metal of the junction-bridging liner section.

The arrangement of the present invention has the important advantage that in the event of explosion or sudden pressure buildup within the vessel, in excess of its rated pressure, the liner ruptures at the aforementioned junctions so that pressure release is controlled exclusively by the tension elements as is desired.

The thickness of the junction-bridging liner section is so dimensioned that, with an opening of the junction, and formation of a pressure-relieving crack, a corresponding rupture of the liner results.

Especially effective results are obtained when the junction-bridging liner section, on its part, is provided with ridges which form-fittingly engage around the ridges of the cast-metal members, thereby supporting the liner against metal flow under elevated pressure against the ridges of the cast-metal members.

The weld-forming bands, which facilitate welding of the liner to the cast-metal members, are preferably fitted into grooves recessed in the inwardly facing wall of the cast-metal members, the connecting bolts or screws being counter-sunk into the band so that their heads are flush therewith. The bands may be flush with the inner wall portions of the cast-metal members.

BRIEF DESCRIPTION OF THE DRAWING

The above and other objects, features and advantages of the present invention will become readily apparent from the following description, reference being made to the accompanying drawing in which;

FIG. 1 is a diagrammatic axial section of a wall-forming portion of a pressure vessel according to the invention; and FIG. 2 is a detail view of the region A of FIG. 1.

SPECIFIC DESCRIPTION

In the drawing, I have shown a wall-forming portion of a pressure vessel for a nuclear reactor. The pressure vessel can be of the type described in my U.S. patent application Ser. No. 635,637 and thus can have a floor and a cover on opposite ends of the wall-forming portion and can consist, at the wall-forming portion, of a plurality of vertically stacked cast-metal annular members 2. Radial inner pre-stress can be applied to the cast-metal members by circumferentially disposed tension membes i (see the aforementioned patent application).

The interior of the vessel can be hermetically sealed against the exterior by internally forming the cast-metal members with a liner of steel composed of main liner sections which are also of steel.

According to the invention, these main liner sections are bridged by junction-spanning liner sections 6 described in greater detail below.

The cast-metal members or annuluses 2 form horizontal junctions or seams 4 between them, these seams being defined by oppositely turned axial faces of members 2 which are pressed together by the vertical tension members or elements 1. In the event of an undesired pressure buildup within the vessel, members 2 tend to separate and the junction or seam 4 is widened to give rise to a pressure release in a controlled manner, the spreading of the junction to form a crack being controlled by the tension elements 1.

As can be seen especially from FIG. 2, adjacent to junction 4, the members 2 are provided with inwardly extending annular rips or ridges 5 which reduce the inner diameter of the vessel (without the liner), these ridges constituting support ridges for the junction-bridging liner section 6. To this end, the junction-bridging liner section 6 is formed with an outwardly open groove which can receive the two ridges 5 adjacent the respective junction 4. At the upper and lower edges, the junction-bridging line section 6 is provided with ridges or beads 8 which engage around the ridges 6 and prevent flow of the material of the junction-bridging liner section 6 into the crack formed at the junction 4 upon separation of the members 2 against the force of the tension elements 1.

More specifically, the section 6 bridges the support ridges 5 and has a reduced thickness D in the region of the junction. The ridges can project radially into the vessel by a distance equal to the difference between the thickness D and the normal thickness of the main liner sections 3 as represented at T.

The bridging liner section 6 is joined to the adjacent main liner sections 3 by respective weld seams 7.

The junction-bridging liner section 6 is, moreover, composed of a steel of low yieldability and tensile strength dimensioned such that this section will rupture upon the development of a pressure sufficient to spread the members 2 apart and form a gap at the junction 4.

Thus the liner invariably will rupture precisely at the desired crack-forming region defined by the junction 4.

As is also apparent from FIG. 2, the weld seams 7 serve simultaneously to join the liner 3,6 to the wall-forming structure.

It has been found to be advantageous, in this regard, to provide each of the cast-metal members 2 with an outwardly open roof 9 directly adjacent to the respective ridge 5 and in which a band or strip 11 of a metal which preferentially bonds to the weldment 7 is received flush with the surface of the member 2 lying inwardly of the respective ridge 5.

The weld-promoting bands 11 are attached to the cast-metal members 2 by bolts 10 which have their heads countersunk into the bands 11 flush with the inwardly turned surface thereof. The bands 11 thus ensure that a well-defined and firm bond will be generated by welding between the seam 7 and the cast-metal members 2.

I claim:

1. In a pressure vessel, especially for a nuclear reactor core, having a wall structure, the improvement wherein said wall structure comprises:

a plurality of annular cast members in stacked relatinship defining a cylindrical stack having at least one junction lying in a plane perpendicular to the axis of the stack;

a plurality of tension elements spaced around said stack and stressing the members thereof together parallel to said axis to resist separation of said members and said junction whereby, upon such separation, a pressure-releasing crack is formed in said wall structure; and a liner internally lining said wall structure, said liner comprising a plurality of main liner sections and at least one junction-bridging liner section secured to said main liner sections and bridging said junction, said junction-bridging liner section comprising means that will cause rupture of said junction-bridging liner upon the development of a pressure within said vessel sufficient to separate said cast members at said junction.

2. The improvement defined in claim 1 wherein each of said members is formed with an inwardly projecting ridge immediately adjacent said junction, said junction-bridging liner section form-fittingly receiving said ridges.

3. The improvement defined in claim 2 wherein said junction-bridging liner section is of a smaller thickness than said main liner sections.

4. The improvement defined in claim 2 wherein said junction-bridging liner section is composed of a material of lower yieldability than said main liner sections.

5. The improvement defined in claim 2, further comprising respective annular weld seams welding said junction-bridging liner section to adjoining main liner sections.

6. The improvement defined in claim 5 wherein said weld seams bond said liner to said members.

7. The improvement defined in claim 6 wherein each of said members is formed adjacent the respective ridge with an inwardly open groove and a weld-promoting band received in said groove and secured to the respective member, each of said welds bonding to a respective one of said bands.

8. The improvement defined in claim 7 wherein said bands are bolted to said members.

9. The improvement defined in claim 1 wherein said junction-bridging liner section is formed along opposite edges with respective ridges engaging around the ridges of the respective members and maintaining said junction-bridging liner section against flow into the separation formed between said members.

10. The improvement defined in claim 1 wherein a multiplicity of such members is provided, a respective said junction being formed between each pair of adjoining members, each of said junctions being bridged by a respective junction-bridging liner member, said tension elements traversing said members of said stack.

* * * * *